(12) United States Patent
Kaneko et al.

(10) Patent No.: US 12,128,757 B2
(45) Date of Patent: Oct. 29, 2024

(54) LID ASSEMBLY STRUCTURE

(71) Applicant: TOYODA GOSEI CO., LTD., Kiyosu (JP)

(72) Inventors: Kenichiro Kaneko, Kiyosu (JP); Kohei Shirota, Kiyosu (JP); Kazuki Fujisawa, Nagoya (JP); Yuki Terazawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/446,098

(22) Filed: Aug. 8, 2023

(65) Prior Publication Data

US 2024/0100940 A1 Mar. 28, 2024

(30) Foreign Application Priority Data

Sep. 28, 2022 (JP) ................................. 2022-155615

(51) Int. Cl.
*B60K 15/05* (2006.01)
*B60L 53/16* (2019.01)

(52) U.S. Cl.
CPC .............. *B60K 15/05* (2013.01); *B60L 53/16* (2019.02)

(58) Field of Classification Search
CPC ................................. B60K 15/05; B60L 53/16
USPC ....................................................... 296/97.22
See application file for complete search history.

(56) References Cited

U.S. PATENT DOCUMENTS 11,214,141 B2 * 1/2022 Yagura ................... B60K 15/05

FOREIGN PATENT DOCUMENTS

JP 2020-128111 A 8/2020

* cited by examiner

*Primary Examiner* — Mahmoud Gimie
(74) *Attorney, Agent, or Firm* — Posz Law Group, PLC (57) ABSTRACT

In a lid assembly structure 1 which includes a base member 2, a lid 3, and an opening/closing mechanism 5 and in which the opening/closing mechanism 5 includes a biasing member 8, during assembling of the base member 2 and the opening/closing mechanism 5, the biasing member 8 is guided by a guide portion 90 which is a part of the opening/closing mechanism 5, and a state of the biasing member 8 is changed from a temporary assembled state where a second engagement end 82 of the biasing member 8 and a temporary engagement portion 93 engage with each other to a main assembled state where the second engagement end 82 and a main engagement portion 91 of a mating member engage with each other, thereby accumulating at least a part of a biasing force in the biasing member 8.

6 Claims, 9 Drawing Sheets

LID ASSEMBLY STRUCTURE

CROSS-REFERENCE TO RELATED APPLICATION

This application claims priority based on Japanese Patent Application No. 2022-155615 filed on Sep. 28, 2022, the entire contents of which are incorporated by reference herein.

TECHNICAL FIELD

The present invention relates to a lid assembly structure that is mounted on a vehicle and that is for opening/closing an energy supply port.

BACKGROUND ART

As a vehicle lid device mounted on a vehicle, a device that covers an energy supply port provided in a vehicle body, such as a fuel port, a charge port, or the like for supplying energy to a vehicle, from the outside or opens the energy supply port with a lid, has been known.

As such a type of vehicle lid device, there is a device that includes: a base member attached to a vehicle body; a lid whose position is changed between a closed position at which the lid covers the energy supply port and an opened position at which the lid opens the energy supply port; and a biasing member that is assembled directly or indirectly to the base member and the lid and that biases the lid to the opened position (see, for example, JP 2020-128111 (A)).

A biasing force is accumulated in the biasing member when the lid is at the closed position. The biasing member biases the lid toward the opened position by the biasing force.

SUMMARY OF INVENTION

Technical Problem

Here, the biasing member of the above vehicle lid device accumulates and releases a relatively large biasing force, and thus a relatively large force is required to assemble the biasing member.

Therefore, the work of assembling the biasing member to a mating member such as the base member is complicated, so that there is a concern that a facility required for the assembling work may be complicated or erroneous assembling due to manual work by a worker may occur.

The present invention has been made in view of such circumstances, and an object of the present invention is to provide a lid assembly structure in which a biasing member is assembled to a mating member through simple work.

Solution to Problem

A lid assembly structure according to a first aspect which solves the above problem is a lid assembly structure including:
a base member attached to a vehicle body of a vehicle;
a lid whose position is changed between a closed position at which the lid covers an energy supply port provided in the vehicle body and an opened position at which the lid opens the energy supply port; and
an opening/closing mechanism assembled to the base member and the lid and configured to open/close the lid, wherein
the opening/closing mechanism includes a cover member assembled to the base member, a shaft assembled to the lid and rotatably supported on the cover member, and a biasing member attached to the shaft and configured to bias the lid to the opened position,
the shaft has a first engagement portion with which a first engagement end of the biasing member engages,
the cover member has a temporary engagement portion with which a second engagement end of the biasing member detachably engages,
the base member has a main engagement portion with which the second engagement end engages, and a guide portion configured to guide the second engagement end from the temporary engagement portion toward the main engagement portion, and
during assembling of the base member and the opening/closing mechanism, the biasing member whose first engagement end engages with the first engagement portion is guided by the guide portion, and a state of the biasing member is changed from a temporary assembled state where the second engagement end and the temporary engagement portion engage with each other to a main assembled state where the second engagement end and the main engagement portion engage with each other, thereby accumulating at least a part of a biasing force in the biasing member.

A lid assembly structure according to a second aspect which solves the above problem is a lid assembly structure including:
a base member attached to a vehicle body of a vehicle;
a lid whose position is changed between a closed position at which the lid covers an energy supply port provided in the vehicle body and an opened position at which the lid opens the energy supply port; and
an opening/closing mechanism assembled to the base member and the lid and configured to open/close the lid, wherein
the opening/closing mechanism includes a cover member assembled to the base member, a shaft assembled to the lid and rotatably supported on the cover member, and a biasing member attached to the shaft and configured to bias the lid to the opened position,
the base member has a first engagement portion with which a first engagement end of the biasing member engages, and a temporary engagement portion with which a second engagement end of the biasing member detachably engages,
the shaft has a main engagement portion with which the second engagement end engages, and a guide portion configured to guide the second engagement end from the temporary engagement portion toward the main engagement portion, and
during assembling of the base member and the opening/closing mechanism, the biasing member whose first engagement end engages with the first engagement portion is guided by the guide portion, and a state of the biasing member is changed from a temporary assembled state where the second engagement end and the temporary engagement portion engage with each other to a main assembled state where the second engagement end and the main engagement portion engage with each other, thereby accumulating at least a part of a biasing force in the biasing member.

In the lid assembly structure according to the present invention, the biasing member is assembled to a mating member through simple work.

DESCRIPTION OF EMBODIMENTS

A lid assembly structure according to a first aspect of the present invention and a lid assembly structure according to a second aspect of the present invention each include:
- a base member attached to a vehicle body of a vehicle;
- a lid whose position is changed between a closed position at which the lid covers an energy supply port provided in the vehicle body and an opened position at which the lid opens the energy supply port; and
- an opening/closing mechanism assembled to the base member and the lid and configured to open/close the lid, wherein
- the opening/closing mechanism includes a cover member assembled to the base member, a shaft assembled to the lid and rotatably supported on the cover member, and a biasing member attached to the shaft.

That is, in each of the lid assembly structure according to the first aspect of the present invention and the lid assembly structure according to the second aspect of the present invention, the cover member and the shaft are interposed between the lid and the base member. The cover member is assembled to the base member, and the shaft is assembled to the lid and further supported by the cover member.

The shaft rotates with respect to the cover member. Accordingly, the position of the lid is changeable with respect to the base member and the vehicle body to which the base member is attached, and specifically, the position of the lid is changed between the above opened position and closed position.

The biasing member is attached to the shaft. The biasing member biases the lid toward the opened position. As described above, the biasing force of the biasing member is accumulated when the position of the lid is changed from the opened position to the closed position.

Here, in a general lid assembly structure, in order that the position of a lid is reliably changed to an opened position, the biasing force of a biasing member is partially accumulated even when the lid is at the opened position. In other words, the biasing force is accumulated in the biasing member even when the biasing member is assembled to a mating member.

For this reason, in the conventional art, as described above, the work of assembling the biasing member to the mating member is very complicated, so that there is a concern that a facility required for the assembling work may be complicated or erroneous assembling due to manual work by a worker may occur.

On the other hand, in each of the lid assembly structure according to the first aspect of the present invention and the lid assembly structure according to the second aspect of the present invention, the biasing member accumulates a biasing force when members included in the lid assembly structure are assembled to each other.

Specifically, in the lid assembly structure according to the first aspect of the present invention,
- the shaft has a first engagement portion with which a first engagement end of the biasing member engages,
- the cover member has a temporary engagement portion with which a second engagement end of the biasing member detachably engages, and
- the base member has a main engagement portion with which the second engagement end engages, and a guide portion configured to guide the second engagement end from the temporary engagement portion toward the main engagement portion.

In the lid assembly structure according to the second aspect of the present invention,
- the base member has a first engagement portion with which a first engagement end of the biasing member engages, and a temporary engagement portion with which a second engagement end of the biasing member detachably engages, and
- the shaft has a main engagement portion with which the second engagement end engages, and a guide portion configured to guide the second engagement end from the temporary engagement portion toward the main engagement portion.

In each of the lid assembly structure according to the first aspect of the present invention and the lid assembly structure according to the second aspect of the present invention,
- during assembling of the base member and the opening/closing mechanism, the biasing member whose first engagement end engages with the first engagement portion is guided by the guide portion, and a state of the biasing member is changed from a temporary assembled state where the second engagement end and the temporary engagement portion engage with each other to a main assembled state where the second engagement end and the main engagement portion engage with each other, thereby accumulating at least a part of a biasing force in the biasing member.

As described above, in the lid assembly structure according to the first aspect of the present invention and the lid assembly structure according to the second aspect of the present invention, during assembling of the base member and the opening/closing mechanism which form parts of the lid assembly structure, a biasing force is accumulated in the biasing member while the biasing member is assembled to a mating member.

Also, during assembling of the base member and the opening/closing mechanism, the second engagement end of the biasing member that has engaged with the temporary engagement portion, which is provided to the cover member, is guided by the guide portion, which is provided to the base member, to the main engagement portion of the base member which is a mating member (first aspect).

Or, during assembling of the base member and the opening/closing mechanism, the second engagement end of the biasing member that has engaged with the temporary engagement portion, which is provided to the base member, is guided by the guide portion, which is provided to the shaft, to the main engagement portion of the shaft which is a mating member (second aspect).

Accordingly, in the lid assembly structure according to the first aspect of the present invention and the lid assembly structure according to the second aspect of the present invention, the biasing member in a state where at least a part of the biasing force is accumulated therein is assembled to the mating member through simple work.

Hereinafter, the lid assembly structure according to the first aspect of the present invention and the lid assembly structure according to the second aspect of the present invention will be described for each component thereof.

Unless otherwise specified, a numerical value range "x to y" described herein includes, in the range, a lower limit "x" and an upper limit "y". A new numerical value range may be formed by arbitrarily combining such upper limit values, lower limit values, and numerical values described in embodiments. Furthermore, numerical values selected arbitrarily from any of the above numerical ranges may be used as numerical values for the upper and lower limits of the new numerical value range.

In addition, the components common to the lid assembly structure according to the first aspect and the lid assembly structure according to the second aspect, the action thereof, etc., are sometimes described in a comprehensive manner in which the components, etc., are simply referred to as components, etc., of the lid assembly structure according to the present invention. Also, the lid assembly structure according to the first aspect of the present invention is sometimes simply referred to as lid assembly structure according to the first aspect, and the lid assembly structure according to the second aspect of the present invention is sometimes simply referred to as lid assembly structure according to the second aspect.

The lid assembly structure according to the present invention includes a base member, a lid, and an opening/closing mechanism.

Among these components, the base member is a part, of the lid assembly structure according to the present invention, attached to a vehicle body of a vehicle.

In order for the lid included in the lid assembly structure to cover or open an energy supply port, the base member is preferably placed near the energy supply port.

Furthermore, in order to inhibit the entry of foreign matter into the vicinity of the energy supply opening, the base member particularly preferably has a shape surrounding the energy supply port, specifically, a frame shape, a tubular shape, a box shape, or the like. In this case, the base member further preferably demarcates the energy supply port together with the lid at the closed position from the outside environment.

By changing the position of the lid between the closed position at which the lid covers the energy supply port and the opened position at which the lid opens the energy supply port as described above, the energy supply port is separated from the outside environment or the energy supply port is exposed to the outside environment.

The shape of the lid is not particularly limited as long as the shape allows the lid to cover the energy supply port at the closed position and allows the lid to open the energy supply port at the opened position.

However, in the case where the base member has the above-described shape surrounding the energy supply port, the shape is particularly preferably a shape that allows the lid to cover an opening end portion, of the base member, which is located on the outside environment side, that is, the side opposite to the energy supply port.

The shape of the lid and a position change mechanism of the lid will be described in detail later.

The opening/closing mechanism is a mechanism that is assembled to the above-described base member and lid and that is for opening/closing the lid. The opening/closing mechanism includes a cover member, a shaft, and a biasing member.

Among these components, the cover member is assembled to the base member. The shaft is assembled to the lid and rotatably supported on the cover member.

Therefore, the lid assembled to the shaft rotates uniaxially or multiaxially about the rotation axis of the shaft. Accordingly, the position of the lid is changed with respect to the cover member, and is also changed with respect to the base member to which the cover member is assembled, the vehicle body to which the base member is attached, and further the energy supply port which is provided in the vehicle body.

Here, the lid may have a simple plate shape, for example. Alternatively, the lid may have a lid body portion having a plate shape, and a leg portion extending from the lid body portion. In the case where the lid has a leg portion, the shaft is preferably assembled to the leg portion.

The leg portion of the lid may be immobile with respect to the lid body portion or may be movable with respect to the lid body portion. Specifically, the leg portion may be pivotally supported on the lid body portion.

When the shaft is assembled directly to the lid that does not have a leg portion, or when the shaft is assembled to the leg portion that is immobile with respect to the lid body portion, the lid is considered to uniaxially rotate about the rotation axis of the shaft. When the shaft is assembled to the leg portion that is pivotally supported on the lid body portion, the lid is considered to multiaxially rotate about the rotation axis of the shaft.

The shape of the lid and the assembly structure of the lid and the shaft are not limited thereto, and various shapes and assembly structures may be adopted.

The shape of the shaft is not particularly limited as long as the shaft is assembled to the lid and is rotatable with respect to the cover member and the biasing member is attachable to the shaft. Examples of the shape of the shaft include a tubular or columnar shape extending in the rotation axis direction, etc.

The shaft may rotate with respect to the cover member, and may be directly assembled to the cover member or may be assembled to the cover member indirectly via another member. The shaft may be detachable or non-detachable from the cover member.

A specific example of a method for directly assembling the shaft to the cover member is a method in which a through hole through which the shaft is inserted is provided in the cover member, and the shaft is directly inserted into the through hole. This through hole is referred to as hole.

In this case, the shaft inserted into the hole rotates within the hole.

A specific example of a method for indirectly assembling the shaft to the cover member is a method in which a speed reducer such as a damper is interposed between the shaft and the cover member.

In this case, for example, the speed reducer may be attached to the shaft formed in a tubular shape, both may be connected to each other, and the shaft and the speed reducer connected to each other may be inserted into the above-described hole of the cover member.

Of course, the method for assembling the shaft and the cover member in the lid assembly structure according to the present invention is not limited to the above methods, and various other methods may be adopted.

The biasing member which is attached to the shaft may be any member that biases the lid to the opened position. Specific examples of the biasing member include a torsion coil spring, a plate spring, etc., but the biasing member is not limited thereto. A method for attaching the biasing member to the shaft is also not particularly limited.

When the attachability of the biasing member to the shaft is taken into consideration, preferably, a torsion coil spring is used as the biasing member, and a coil portion of the torsion coil spring is externally fitted to the shaft.

The biasing member directly or indirectly engages with the lid and the base member, and biases the lid to the opened position by the biasing force accumulated in the biasing member. In other words, one end of the biasing member engages with the lid or the shaft assembled to the lid, and the other end of the biasing member engages with the base member or the cover member assembled to the base member.

In the lid assembly structure according to the first aspect of the present invention, the first engagement end corresponding to the one end of the biasing member engages with the shaft. Therefore, the shaft in the lid assembly structure according to the first aspect has a first engagement portion with which the first engagement end engages.

In the lid assembly structure according to the first aspect of the present invention, the second engagement end corresponding to the other end of the biasing member engages with the base member. Therefore, the base member in the lid assembly structure according to the first aspect has a main engagement portion with which the second engagement end engages.

When the position of the lid is changed from the opened position toward the closed position, the shaft rotates, and the relative positions of the first engagement end and the second engagement end of the biasing member are changed. Accordingly, a biasing force is accumulated in the biasing member.

In addition, when the biasing member releases the accumulated biasing force, the relative positions of the first engagement end and the second engagement end of the biasing member are changed, the shaft rotates, and the position of the lid is changed from the closed position toward the opened position.

Here, the cover member in the lid assembly structure according to the first aspect of the present invention has a temporary engagement portion with which the second engagement end of the biasing member detachably engages.

The biasing member in the lid assembly structure according to the first aspect of the present invention is assembled to the shaft and the cover member in a temporary assembled state. In the lid assembly structure according to the first aspect, an integrated body of the shaft, the cover member, and the biasing member which are assembled to each other is sometimes referred to as assembly. The assembly may include another member.

In the lid assembly structure according to the first aspect, in the temporary assembled state, the first engagement end of the biasing member engages with the first engagement portion of the shaft, and the second engagement end of the biasing member engages with the temporary engagement portion of the cover member.

By assembling the assembly of the first aspect to the base member, the integrated body of the shaft, the cover member, and the biasing member is obtained.

During assembling of the assembly of the first aspect to the base member, the cover member and the base member come closer to each other. Accordingly, the second engagement end of the biasing member which engages with the temporary engagement portion of the cover member, and the base member also come closer to each other. Then, the guide portion which is provided to the base member guides the second engagement end of the biasing member from the temporary engagement portion of the cover member toward the main engagement portion of the base member. Accordingly, the second engagement end of the biasing member becomes detached from the temporary engagement portion of the cover member and engages with the main engagement portion of the base member.

Accordingly, in the lid assembly structure according to the first aspect, during assembling of the assembly of the first aspect to the base member, the state of the biasing member that has been in the temporary assembled state is automatically changed to a main assembled state while at least a part of the biasing force is accumulated in the biasing member.

Meanwhile, in the lid assembly structure according to the second aspect of the present invention, the first engagement end corresponding to the one end of the biasing member engages with the base member. Therefore, the base member in the lid assembly structure according to the second aspect has a first engagement portion with which the first engagement end engages.

In the lid assembly structure according to the second aspect of the present invention, the second engagement end corresponding to the other end of the biasing member engages with the shaft. Therefore, the shaft in the lid assembly structure according to the second aspect has a main engagement portion with which the second engagement end engages.

In the lid assembly structure according to the second aspect as well, when the position of the lid is changed from the opened position toward the closed position, the shaft rotates, and the relative positions of the first engagement end and the second engagement end of the biasing member are changed. Accordingly, a biasing force is accumulated in the biasing member.

When the biasing member releases the accumulated biasing force, the relative positions of the first engagement end and the second engagement end of the biasing member are changed, the shaft rotates, and the position of the lid is changed from the closed position toward the opened position.

Here, the base member in the lid assembly structure according to the second aspect of the present invention has a temporary engagement portion with which the second engagement end of the biasing member detachably engages.

The biasing member in the lid assembly structure according to the second aspect of the present invention is assembled to the base member in a temporary assembled state. In the lid assembly structure according to the second aspect, an integrated body of the base member and the biasing member which are assembled to each other is sometimes referred to as assembly. The assembly may include another member.

In the lid assembly structure according to the second aspect, in the temporary assembled state, the first engagement end of the biasing member engages with the first engagement portion of the base member, and the second engagement end of the biasing member engages with the temporary engagement portion of the base member.

In the lid assembly structure according to the second aspect, by assembling the shaft and the cover member to the above-described assembly of the base member and the biasing member, an integrated body of the shaft, the cover member, and the biasing member is obtained.

During assembling of the shaft to the assembly of the second aspect, the base member and the shaft come closer to each other. Accordingly, the second engagement end of the biasing member which engages with the temporary engagement portion of the base member, and the shaft also come closer to each other. Then, the guide portion which is provided to the shaft guides the second engagement end of the biasing member from the temporary engagement portion of the base member toward the main engagement portion of the shaft. Accordingly, the second engagement end of the biasing member becomes detached from the temporary engagement portion of the base member and engages with the main engagement portion of the shaft.

Accordingly, in the lid assembly structure according to the second aspect, during assembling of at least the shaft to the assembly of the second aspect, the state of the biasing member is automatically changed to a main assembled state while at least a part of the biasing force is accumulated in the biasing member.

By further assembling the lid to the above-described integrated body of the shaft, the cover member, and the biasing member in the lid assembly structure according to the first aspect, the lid assembly structure according to the first aspect is obtained. Similarly, by further assembling the lid to the shaft in the integrated body of the shaft, the cover member, and the biasing member in the lid assembly structure according to the second aspect, the lid assembly structure according to the second aspect is obtained.

As described above, in the lid assembly structure according to the first aspect of the present invention and the lid assembly structure according to the second aspect of the present invention, the state of the biasing member is easily changed to the main assembled state where at least a part of the biasing force is accumulated in the biasing member. Therefore, in the lid assembly structure according to the present invention, the biasing member is assembled to a mating member, that is, the shaft and the base member, through simple work.

The guide portion in the lid assembly structure according to the present invention is provided to the base member in the lid assembly structure according to the first aspect. The guide portion may have any shape that allows the guide portion to guide the second engagement end of the biasing member from the temporary engagement portion to the main engagement portion during assembling of the assembly of the first aspect to the base member, that is, as the assembly of the first aspect comes closer to the base member.

The guide portion in the lid assembly structure according to the present invention is provided to the shaft in the lid assembly structure according to the second aspect. The guide portion may have any shape that allows the guide portion to guide the second engagement end of the biasing member from the temporary engagement portion to the main engagement portion during assembling of the assembly of the second aspect to the shaft, that is, as the assembly of the second aspect comes closer to the shaft.

Hereinafter, the lid assembly structure according to the present invention will be described by means of specific examples.

Embodiment 1

A lid assembly structure according to Embodiment 1 pertains to the lid assembly structure according to the first aspect.

Figure 1:
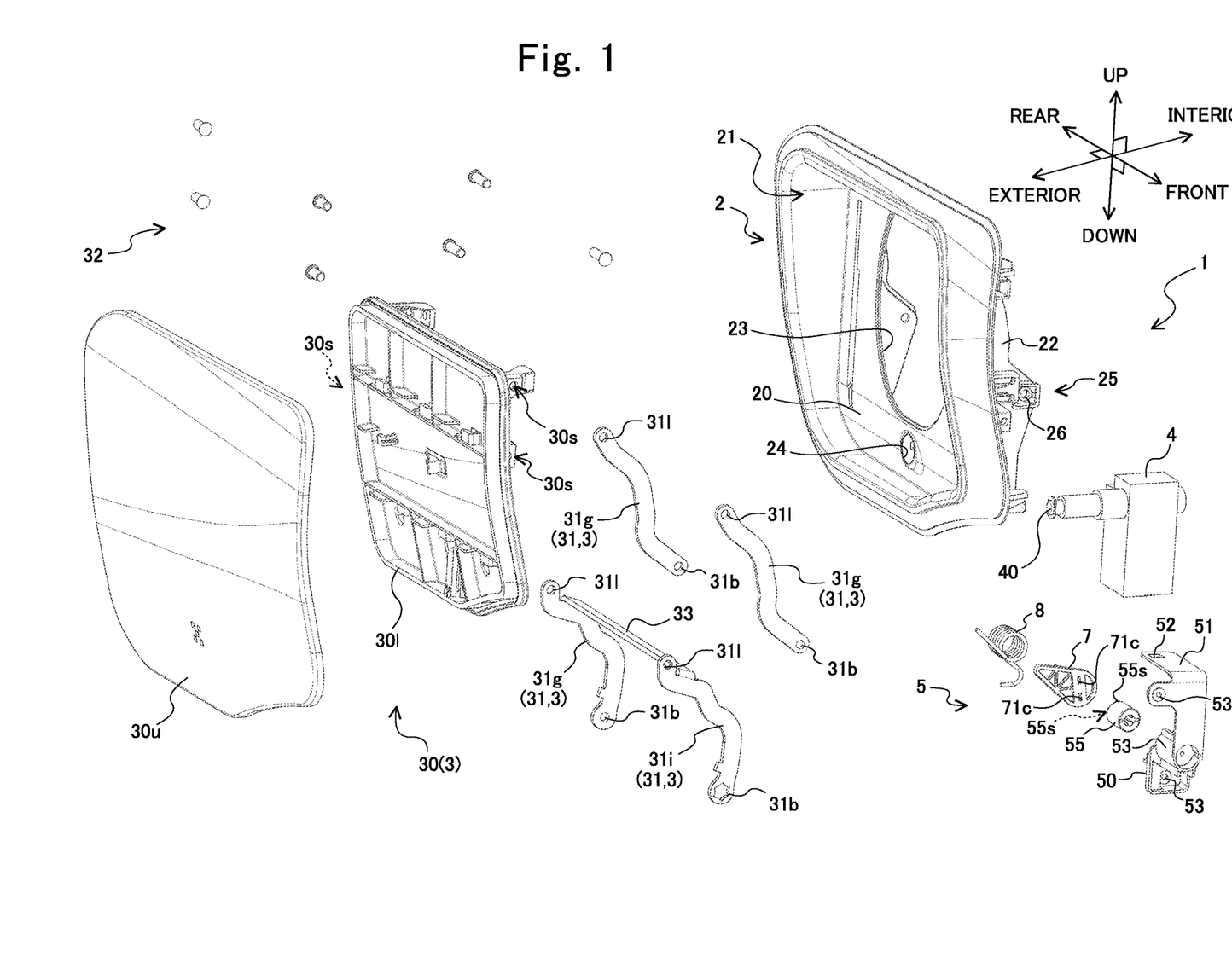
FIG. 1 schematically illustrates a lid assembly structure according to Embodiment 1 in a disassembled state.
Figure 2:
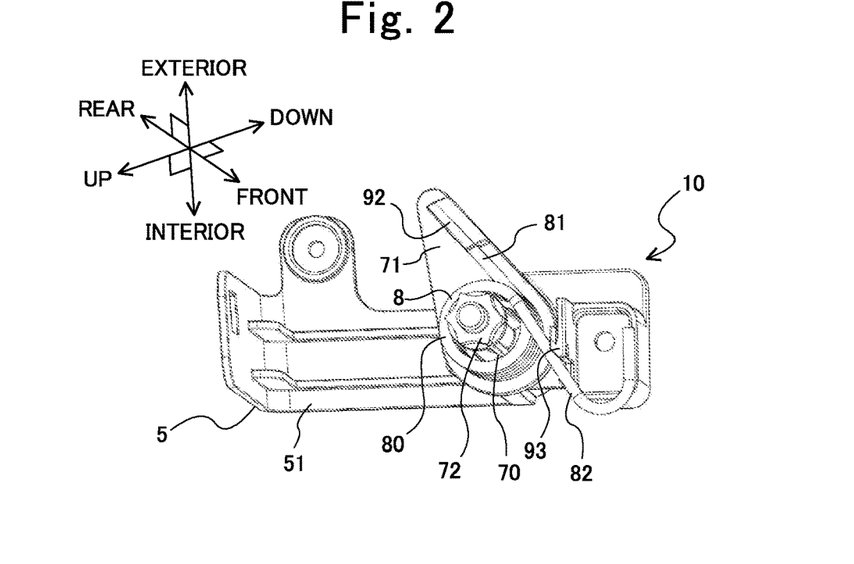
FIG. 2 schematically illustrates an assembly obtained by integrating a shaft, a coupling member, a biasing member, and a cover member in the lid assembly structure according to Embodiment 1.
Figure 6:
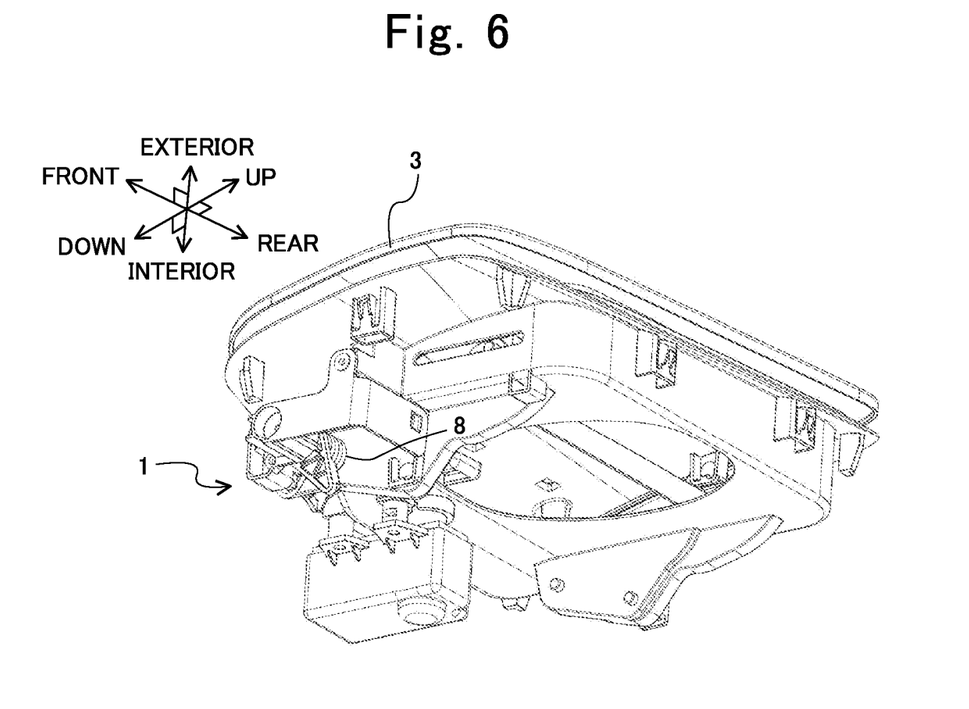
FIG. 6 schematically illustrates the lid assembly structure according to Embodiment 1 during assembling.
Figure 7:
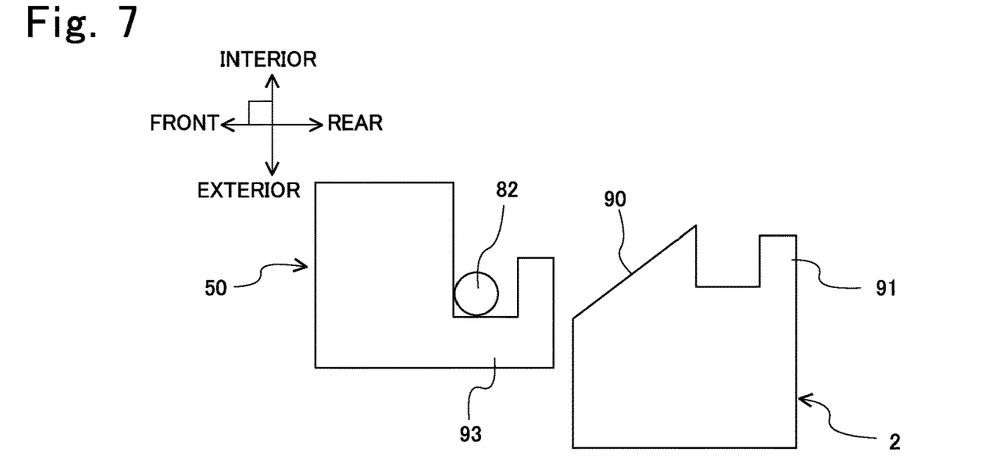
FIG. 7 schematically illustrates the action of the biasing member, a temporary engagement portion, a guide portion, and a main engagement portion of the lid assembly structure according to Embodiment 1 during assembling.
Figure 8:
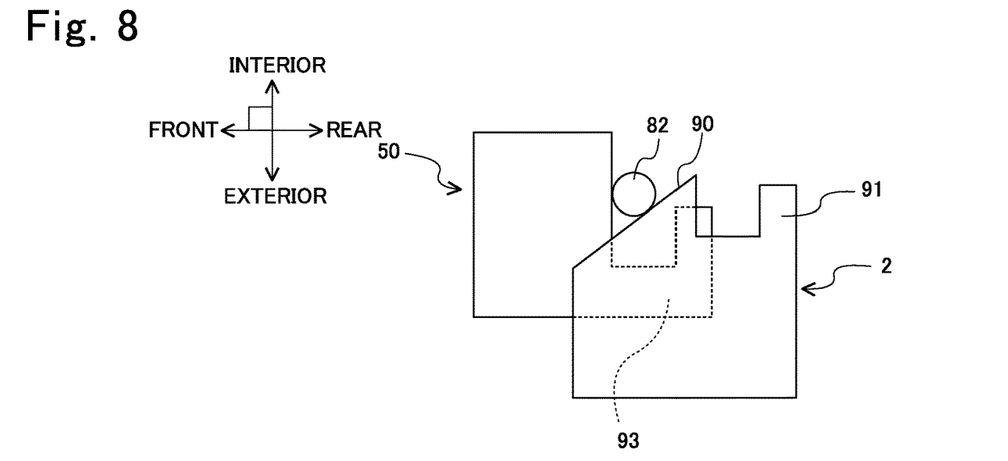
FIG. 8 schematically illustrates the action of the biasing member, the temporary engagement portion, the guide portion, and the main engagement portion of the lid assembly structure according to Embodiment 1 during assembling.
Figure 9:
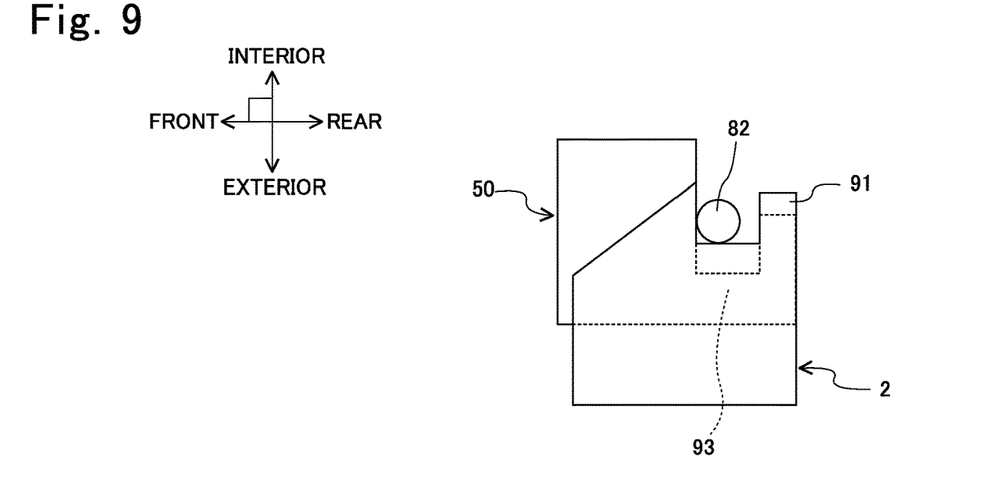
FIG. 9 schematically illustrates the action of the biasing member, the temporary engagement portion, the guide portion, and the main engagement portion of the lid assembly structure according to Embodiment 1 during assembling.

FIG. 1 schematically illustrates the lid assembly structure according to Embodiment 1 in a disassembled state. FIG. 2 schematically illustrates an assembly obtained by integrating a shaft, a coupling member, a biasing member, and a cover member in the lid assembly structure according to Embodiment 1. FIG. 3 to FIG. 6 schematically illustrate the lid assembly structure according to Embodiment 1 during assembling. FIG. 7 to FIG. 9 schematically illustrate the action of the biasing member, a temporary engagement portion, a guide portion, and a main engagement portion of the lid assembly structure according to Embodiment 1 during assembling.

Hereinafter, exterior, interior, upper, lower, front, and rear mean exterior, interior, up, down, front, and rear in each drawing. The exterior means an exterior side with respect to a vehicle body, and the interior means an interior side with respect to the vehicle body, that is, the inner side of a vehicle.

The lid assembly structure according to Embodiment 1 is a device for covering or opening an energy supply port, which is provided in a vehicle body of an electric vehicle which is a type of vehicle, with a lid.

Although not shown, the battery of the electric vehicle is placed on the back side of the vehicle body as in a general electric vehicle. A part, of a vehicle body panel of the vehicle body, located outside the battery is provided with a vehicle body opening that penetrates the vehicle body panel in a thickness direction thereof. The energy supply port (so-called charge port) to the battery is placed inside the vehicle body opening and is exposed to the outside of the vehicle body. The battery and the energy supply port are connected to each other by a charging lead wire.

For reference, examples of the above vehicle body panel provided with the vehicle body opening include an outer panel, a hood, a door panel, etc.

As shown in FIG. 1, a lid assembly structure 1 according to Embodiment 1 includes a base member 2, a lid 3, a locking member 4, and an opening/closing mechanism 5.

The base member 2 is a member attached to the vehicle body (not shown) of the vehicle, has a box shape, and has a bottom wall 20 facing the interior side, that is, the vehicle body side, and an opening 21 facing the exterior side, that is, the outer side of the vehicle body. The base member 2 has a peripheral wall 22 extending in the exterior-interior direction.

The bottom wall 20 of the base member 2 has a window 23 formed so as to penetrate the bottom wall 20 in the exterior-interior direction. The energy supply port which is not shown is placed inside the window 23.

The bottom wall 20 of the base member 2 further has a second window 24 formed at a position below the above window 23 so as to penetrate the bottom wall 20 in the exterior-interior direction. A locking portion 40 of the locking member 4 described later is placed in the second window 24.

A cover assembly portion 25 for assembling a cover member 50 of the opening/closing mechanism 5 described later is provided at a portion, of the peripheral wall 22 of the base member 2, which is located on the front side. The cover assembly portion 25 includes a guide portion 90 and a main engagement portion 91. The cover assembly portion 25 will be described in detail later.

Furthermore, a hole 26 is provided near the cover assembly portion 25 in the peripheral wall 22 of the base member 2 so as to penetrate the peripheral wall 22 in a thickness direction thereof. A shaft input portion 72 of a shaft 7 described later is inserted into the hole 26.

The lid 3 has a lid body portion 30 and a leg portion 31. The lid body portion 30 is formed such that a lid upper part 30$u$ and a lid lower part 30$l$ each having substantially a plate shape are assembled and integrated with each other. The lid upper part 30$u$ is placed on the exterior side with respect to the lid lower part 30$l$, and is exposed to the exterior side in the lid assembly structure 1 according to Embodiment 1.

The lid lower part 30$l$ has four leg pivotally supporting portions 30$s$ which pivotally support the leg portion 31. Each leg pivotally supporting portion 30$s$ has a circular cross-section and a through hole-like shape extending in the front-rear direction, and is provided on the interior surface side of the lid lower part 30$l$. Two of the leg pivotally supporting portions 30$s$ are placed at an upper end side portion of the lid body portion 30, and are spaced apart from each other in the front-rear direction. The other two of the leg pivotally supporting portions 30$s$ are placed at a portion slightly lower than the upper end of the lid body portion 30, and are spaced apart from each other in the front-rear direction.

The lid 3 in the lid assembly structure 1 according to Embodiment 1 has four leg portions 31 each having a long rod shape. A lid pivotally supporting portion 31$l$ is provided in an end portion that is one end portion in the longitudinal direction of each leg portion 31 and that is located on the exterior side, that is, the lid body portion 30 side. Each lid pivotally supporting portion 31$l$ has a circular cross-section and a through hole-like shape extending in the front-rear direction.

Two of the four leg portions 31 are assembled to the leg pivotally supporting portions 30$s$ placed at the upper end side portion of the lid body portion 30, via the lid pivotally supporting portions 31$l$ on the upper side. The other two of the four leg portions 31 are assembled to the leg pivotally supporting portion 30$s$ placed at the portion slightly lower than the upper end of the lid body portion 30. More specifically, a pivot pin 32 is inserted into each corresponding lid pivotally supporting portion 31$l$ and leg pivotally supporting portion 30$s$. Accordingly, each leg portion 31 is pivotally supported on the lid body portion 30 by the pivot pin 32, the lid pivotally supporting portion 31$l$, and the leg pivotally supporting portion 30$s$, and each leg portion 31 rotates relative to the lid body portion 30.

A link rod 33 is extended between the lid pivotally supporting portions 31$l$ of the two leg portions 31 located on the lower side, out of the above-described four leg portions 31. Accordingly, these two leg portions 31 are integrated and rotate integrally.

A base pivotally supporting portion 31$b$ is provided in an end portion that is another end portion in the longitudinal direction of each leg portion 31 and that is located on the interior side, that is, the base member 2 side. Each base pivotally supporting portion 31$b$ has a through hole-like shape extending in the front-rear direction.

Here, of the four leg portions 31, the leg portion 31 located on the lower side and the front side, that is, located on the cover assembly portion 25 side during assembling, is referred to as input leg portion 31$i$, and the other leg portions 31 are referred to as general leg portions 31$g$. The base pivotally supporting portion 31$b$ of the input leg portion 31$i$ has substantially a hexagonal cross-section, and the base pivotally supporting portions 31$b$ of the other leg portions 31 each have a circular cross-section.

An end of the shaft 7 described later is inserted into the base pivotally supporting portion 31$b$ of the input leg portion 31$i$. Therefore, the input leg portion 31$i$ is integrated with the opening/closing mechanism 5. As described later, when the shaft 7 of the opening/closing mechanism 5 rotates, the input leg portion 31$i$ rotates.

Meanwhile, the pivot pin 32 is inserted into the base pivotally supporting portion 31$b$ of each general leg portion 31$g$. Each general leg portion 31$g$ is assembled to a second leg pivotally supporting portion (not shown) provided in the base member 2 and having a circular cross-section and a through hole-like shape, via the pivot pin 32. Therefore, the general leg portion 31$g$ is pivotally supported on the base member 2 by the pivot pin 32, the base pivotally supporting portion 31$b$, and the second leg pivotally supporting portion, and rotates relative to the base member 2. Accordingly, the lid 3 in the lid assembly structure 1 according to Embodiment 1 rotates biaxially.

The locking member 4 in the lid assembly structure 1 according to Embodiment 1 locks the lid 3 by a push-lock mechanism. The locking member 4 has the locking portion 40 which engages with a locking mating portion 35 (see FIG. 3) provided to the lid 3, and is placed on the rear side of the second window 24 with the locking portion 40 facing the lid body portion 30 side, and the locking portion 40 is exposed to the inside of the second window 24.

In Embodiment 1, a second assembly 11 (see FIG. 3) in which the lid 3, the base member 2, and the locking member 4 are assembled is prepared in advance by assembling the base pivotally supporting portion 31$b$ of each general leg portion 31$g$ in the lid 3 to the second leg pivotally supporting portion in the base member 2, and assembling the locking member 4 to the base member 2, and an assembly 10 (see FIGS. 2 and 3) described later is assembled to the second assembly 11.

As shown in FIG. 1, the opening/closing mechanism 5 has the shaft 7, a coupling member 55, a biasing member 8, and the cover member 50.

As shown in FIG. 2, the biasing member 8 is a torsion coil spring. One end portion of the biasing member 8 is referred to as first engagement end, and another end portion of the biasing member 8 is referred to as second engagement end.

As shown in FIG. 2, the shaft 7 has a shaft body portion 70 having substantially a columnar shape, a biasing support portion 71 having substantially a plate shape, and the shaft input portion 72 having a short column shape having substantially a hexagonal cross-section.

The biasing support portion 71 is integrated with one end portion in the axial direction, that is, one end portion in the longitudinal direction, of the shaft body portion 70. The biasing support portion 71 is eccentric with respect to the shaft body portion 70.

The shaft input portion 72 is integrated with another end portion in the axial direction of the shaft body portion 70. The shaft input portion 72 and the shaft body portion 70 are placed coaxially.

The biasing member 8 is externally fitted to the shaft 7. Specifically, a coil portion 80 of the biasing member 8 is attached to the shaft body portion 70, the biasing support portion 71 is placed on the front side of the biasing member 8, and the shaft input portion 72 is exposed to the rear side of the biasing member 8.

A first engagement portion 92 is provided to the biasing support portion 71. A first engagement end 81 of the biasing member 8 engages with the first engagement portion 92.

The coupling member 55 in the lid assembly structure 1 according to Embodiment 1 is a damper. As shown in FIG. 1, a shaft engagement portion 55s having a projection shape is provided to the coupling member 55. Meanwhile, a hole-shaped coupling engagement portion 71c is provided on the front surface side of the biasing support portion 71 in the shaft 7. The coupling member 55 is assembled to the shaft 7 by engaging the shaft engagement portion 55s and the coupling engagement portion 71c with each other.

The cover member 50 has a cover base portion 51 (see FIG. 1) having substantially an L-shaped plate shape, a plurality of base assembly portions 52 (see FIG. 1) provided to the cover base portion 51, a coupling housing portion 53 (see FIG. 1) integrally provided to the cover base portion 51 and having a case shape, and a temporary engagement portion 93 (see FIG. 2) integrally provided to the cover base portion 51 and having substantially a groove shape.

Some of the base assembly portions 52 have a claw shape, and engage with some of a plurality of cover assembly portions 25 (not shown) provided to the base member 2. The other of the base assembly portions 52 have a through hole-like shape, and are bolted to the other of the cover assembly portions 25 provided to the base member 2.

As shown in FIG. 1, the coupling housing portion 53 has a case shape corresponding to the outer shape of the coupling member 55. The coupling member 55 is housed in the coupling housing portion 53 of the cover member 50 such that the shaft engagement portion 55s is exposed.

The assembly 10 shown in FIG. 2 is obtained by housing the coupling member 55 in the coupling housing portion 53, assembling the integrated body of the shaft 7, the biasing member 8, and the coupling member 55 to the cover member 50, and assembling a second engagement end 82 of the biasing member 8 to the temporary engagement portion 93.

Hereinafter, a method for assembling the above assembly 10 to the second assembly 11 of the base member 2 and the lid 3 and the action of each member will be described.

Figure 3:
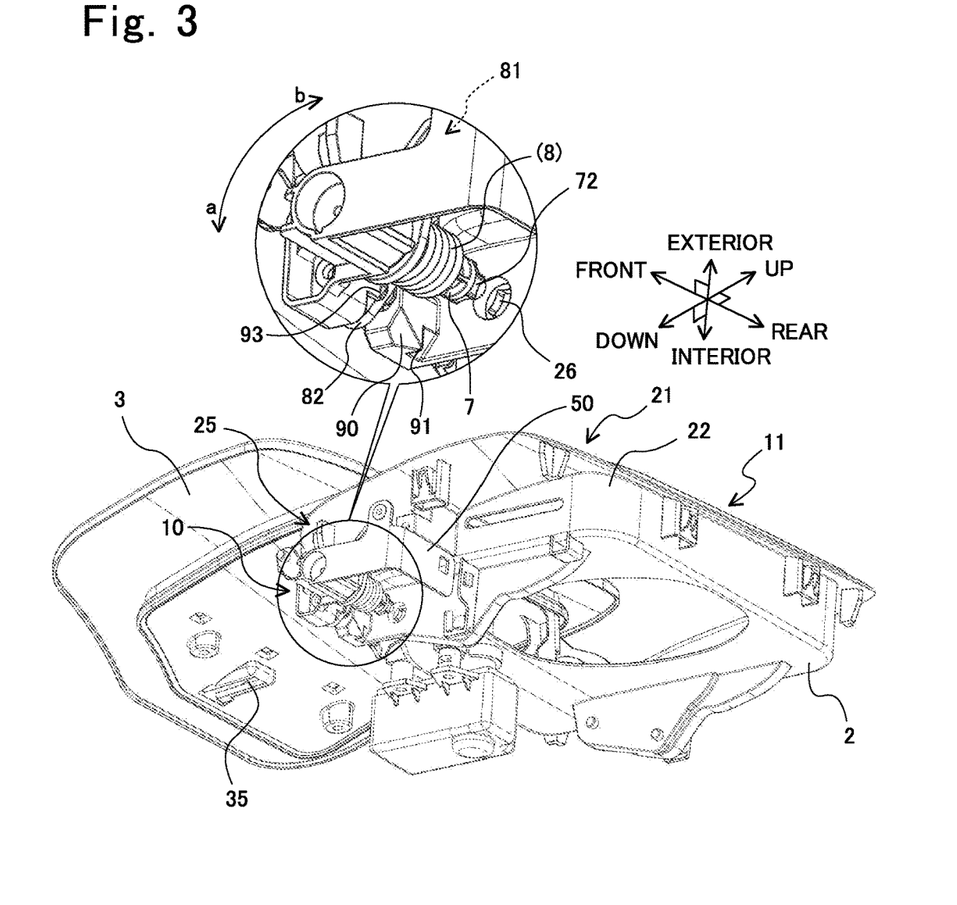
FIG. 3 schematically illustrates the lid assembly structure according to Embodiment 1 during assembling.

First, as shown in FIG. 3, the assembly 10 is placed on the front side of the second assembly 11. More specifically, the assembly 10 is placed on the front side of the cover assembly portions 25 in the base member 2 of the second assembly 11, the shaft 7 of the assembly 10 is caused to face the rear side, that is, the base member 2 side, and the cover member 50 is caused to face the front side.

Then, the assembly 10 is brought closer to the second assembly 11 while the shaft input portion 72 of the shaft 7 is inserted into the hole 26 which is provided in the peripheral wall 22 of the base member 2.

At this time, a slight biasing force is accumulated in the biasing member 8. The biasing member 8 is in a temporary assembled state where the first engagement end 81 of the biasing member 8 engages with the first engagement portion 92 of the shaft 7 and the second engagement end 82 of the biasing member 8 engages with the temporary engagement portion 93 of the cover member 50. In other words, the biasing member 8 is stably held by the shaft 7 and the cover member 50, that is, another member included in the assembly 10, while accumulating a part of the biasing force.

Here, in the lid assembly structure 1 according to Embodiment 1, as described above, each cover assembly portion 25 is provided at the portion, of the peripheral wall 22 of the base member 2, which is located on the front side. The cover assembly portion 25 includes the guide portion 90 and the main engagement portion 91.

The temporary engagement portion 93 has a groove shape that is open toward the interior side. Therefore, when the position of the second engagement end 82 of the biasing member 8 is changed in the interior direction, the temporary engagement between the second engagement end 82 and the temporary engagement portion 93 is released. In other words, the disengagement direction of the temporary engagement portion 93 in the lid assembly structure 1 according to Embodiment 1 is the interior direction.

The cover assembly portion 25 is placed near the hole 26.

The main engagement portion 91 in the cover assembly portion 25 has a groove shape that is open toward the interior side as in the temporary engagement portion 93.

During assembling, the main engagement portion 91 and the guide portion 90 are located on the fore side in a biasing force accumulation direction of the second engagement end 82 with respect to the temporary engagement portion 93. The biasing force accumulation direction of the second engagement end 82 is a direction in which the position of the second engagement end 82 is changed in order to accumulate a biasing force in the biasing member 8, and more specifically, means a counterclockwise direction a in FIG. 3 in the lid assembly structure 1 according to Embodiment 1.

In the above biasing force accumulation direction of the second engagement end 82, the guide portion 90 is located between the temporary engagement portion 93 and the main engagement portion 91. The projection height of the guide portion 90 facing the interior side, that is, the height of the guide portion 90 in the disengagement direction of the temporary engagement portion 93, gradually increases toward the fore side in the biasing force accumulation direction of the second engagement end 82, that is, from the temporary engagement portion 93 side toward the main engagement portion 91 side. The guide portion 90 is considered to have an inclined wall shape.

When the assembly 10 is advanced toward the rear side and brought closer to the second assembly 11, the shaft 7 and the cover member 50, and the base member 2 come closer to each other (see FIG. 3 and FIG. 7). Therefore, the temporary engagement portion 93 of the cover member 50 and the second engagement end 82 of the biasing member 8 which engages with the temporary engagement portion 93 come closer to the cover assembly portion 25 of the base member 2.

Figure 4:
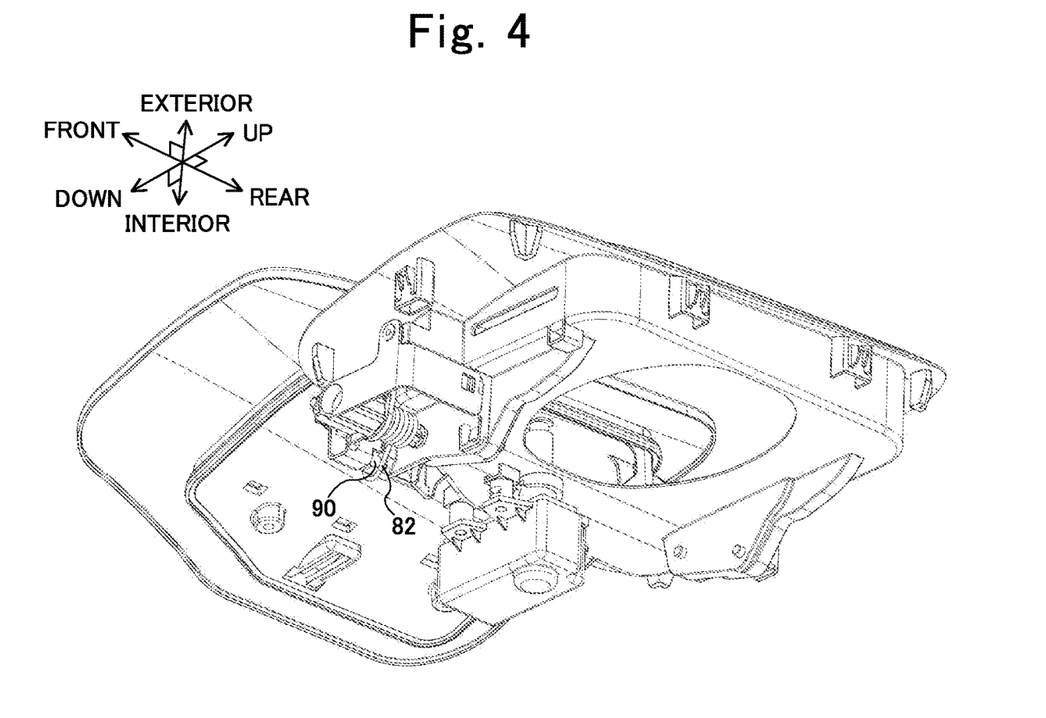
FIG. 4 schematically illustrates the lid assembly structure according to Embodiment 1 during assembling.

When the assembly 10 is further advanced toward the rear side, the shaft input portion 72 of the shaft 7 is inserted into the hole 26 of the base member 2, the guide portion 90 in the cover assembly portion 25 comes into contact with the second engagement end 82, and the second engagement end 82 moves onto the guide portion 90 (see FIG. 4 and FIG. 8). Accordingly, the second engagement end 82 becomes detached from the temporary engagement portion 93, and the temporary engagement between the second engagement end 82 and the temporary engagement portion 93 is released.

Figure 5:
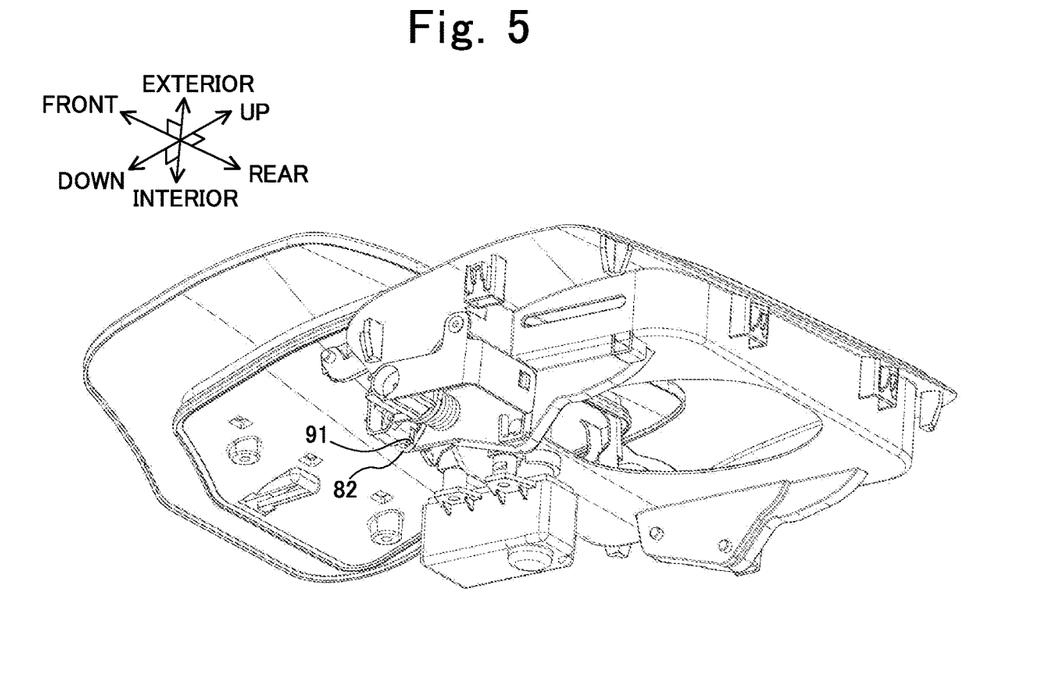
FIG. 5 schematically illustrates the lid assembly structure according to Embodiment 1 during assembling.

When the assembly 10 is even further advanced toward the rear side, the second engagement end 82 is guided by the guide portion 90, the position of the second engagement end 82 is changed in the biasing force accumulation direction to accumulate a further biasing force, and the second engagement end 82 reaches the main engagement portion 91, which is provided to the cover member 50, and falls into the main engagement portion 91 having a groove shape (see FIG. 5 and FIG. 9). Accordingly, the second engagement end 82 engages with the main engagement portion 91, and the state of the biasing member 8 is changed to the main assembled state.

Thereafter, the assembly 10 is fixed to the second assembly 11 by assembling the base assembly portions 52 of the cover member 50 and the cover assembly portions 25 of the base member 2 to each other.

The base pivotally supporting portion 31b of the input leg portion 31i which is one of the four leg portions 31 of the lid 3 is placed on the rear side of the hole 26 which is provided in the base member 2. Therefore, the shaft input portion 72 of the shaft 7 inserted into the hole 26 engages with the base pivotally supporting portion 31b of the input leg portion 31i, so that the shaft 7 and the input leg portion 31i are integrated with each other.

As described above, the lid 3 in the lid assembly structure 1 according to Embodiment 1 rotates biaxially. Accordingly, the position of the lid 3 is changed between the opened position at which, as shown in FIG. 3 to FIG. 5, the lid 3 opens the opening 21 of the base member 2 and the energy supply port which is not shown, and the closed position at which, as shown in FIG. 6, the lid 3 covers the opening 21 of the base member 2 and the energy supply port which is not shown.

In the lid assembly structure 1 according to Embodiment 1, the assembly 10 is assembled to the second assembly 11 when the lid 3 is at the opened position. The position of the lid 3 is manually changed from the opened position to the closed position.

When the position of the lid 3 is changed from the opened position to the closed position, the leg portion 31 rotates. When the input leg portion 31i which is one of the leg portions 31 rotates, the shaft 7 rotates following the rotation. When the shaft 7 rotates, the position of the first engagement end 81 of the biasing member 8 which is attached to the shaft 7 is changed in the biasing force accumulation direction of the first engagement end 81. The biasing force accumulation direction of the first engagement end 81 refers to the direction in which the position of the first engagement end 81 is changed in order to accumulate a biasing force in the biasing member 8, and more specifically, means a clockwise direction b in FIG. 3 in the lid assembly structure 1 according to Embodiment 1.

By changing the position of the first engagement end 81 in the biasing force accumulation direction, a further biasing force is accumulated in the biasing member 8. Therefore, when the position of the lid 3 is changed to the closed position as shown in FIG. 6, the biasing member 8 comes into a state where a biasing force for changing the position of the lid 3 to the opened position is accumulated in the biasing member 8.

When the position of the lid 3 is changed to the closed position, the locking portion 40 of the locking member 4 comes into contact with the locking mating portion 35 of the lid 3, and the lid 3 is locked. When the lid 3 at the closed position is pressed in the interior direction, the lock between the locking member 4 and the lid 3 is released. As a result, the lid 3 comes into a free state, and the biasing force of the biasing member 8 is released. Then, the shaft 7 is rotationally driven, and the input leg portion 31i rotates. Then, the other leg portions 31 also rotate following the rotation of the input leg portion 31i, and the position of the lid 3 is changed to the opened position.

In the lid assembly structure 1 according to Embodiment 1, when the assembly 10 including the biasing member 8 is assembled to the second assembly 11 including the base member 2, the state of the biasing member 8 that has been in the temporary assembled state is automatically changed to the main assembled state while a part of the biasing force is accumulated in the biasing member 8. Accordingly, in the lid assembly structure 1 according to Embodiment 1, the biasing member 8 is assembled to the base member 2 which is a mating member, through simple work.

Embodiment 2

A lid assembly structure according to Embodiment 2 pertains to the lid assembly structure according to the second aspect.

Figure 10:
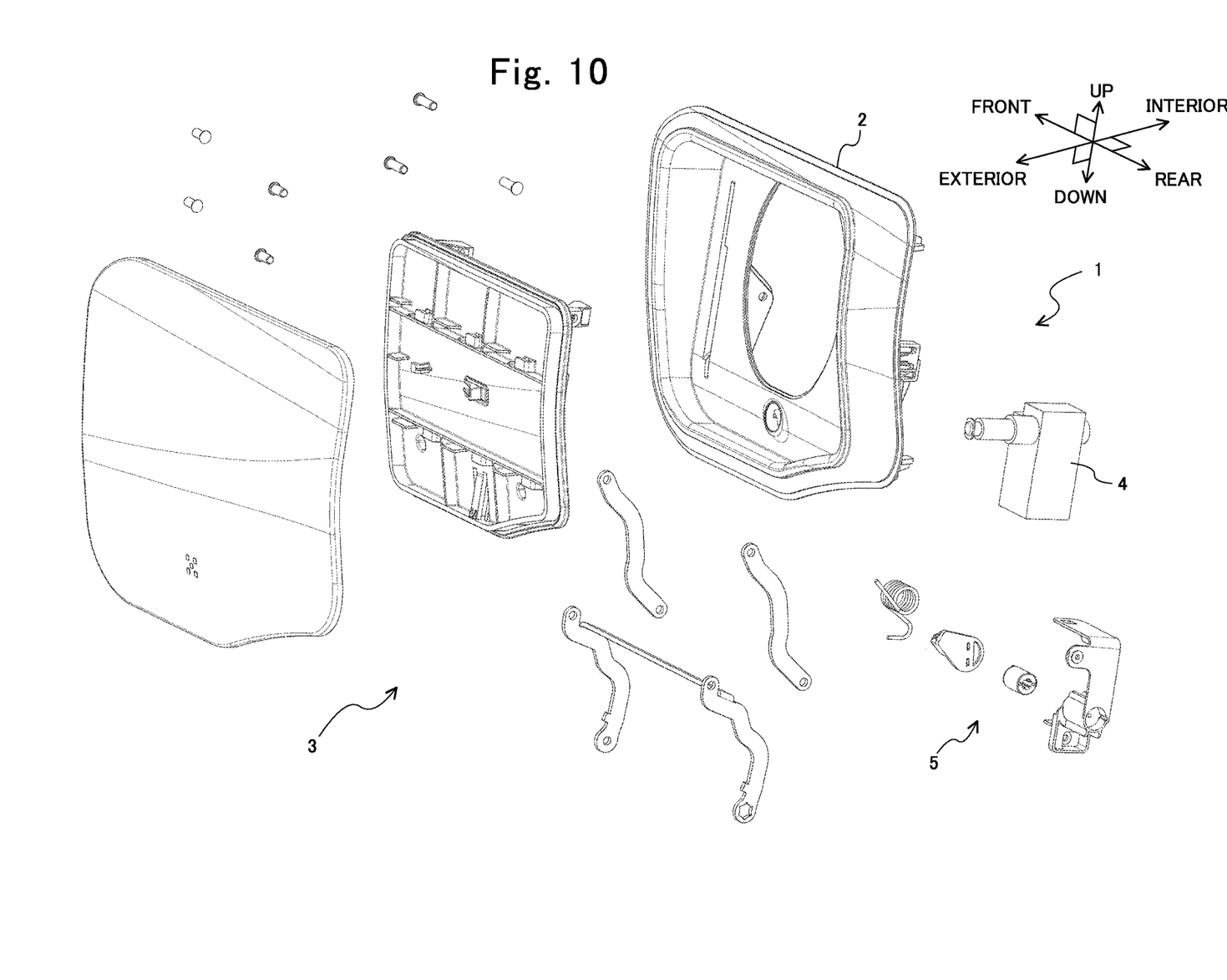
FIG. 10 schematically illustrates a lid assembly structure according to Embodiment 2 in a disassembled state.
Figure 11:
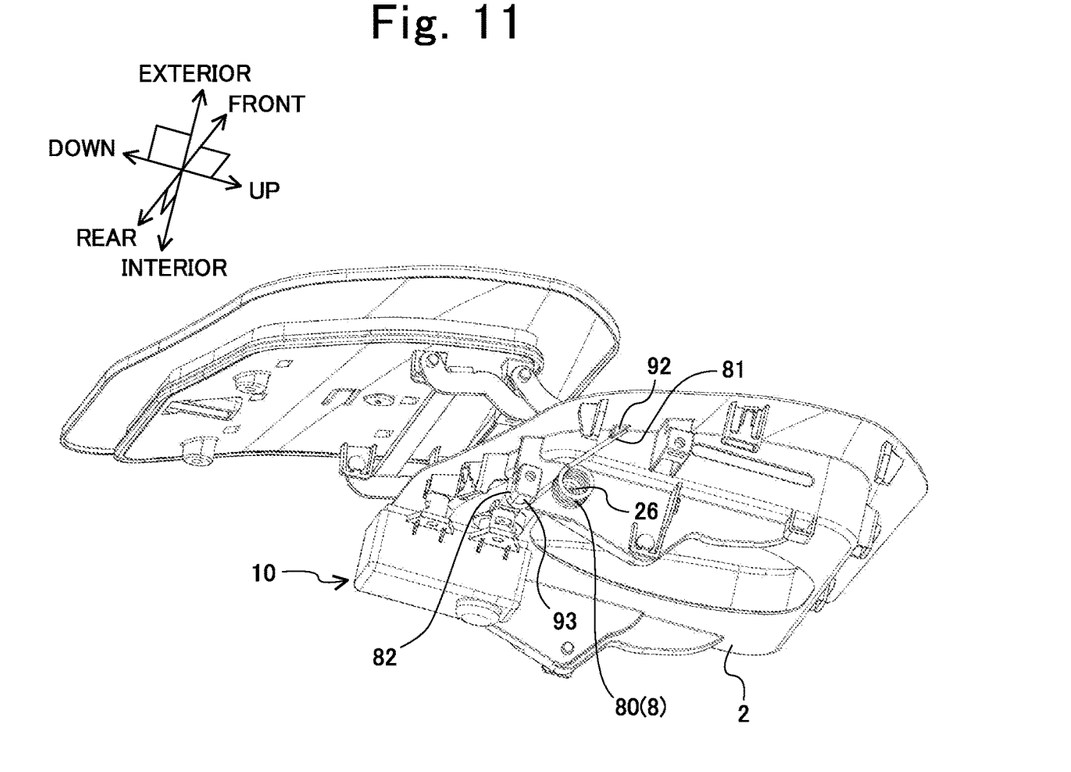
FIG. 11 schematically illustrates an assembly obtained by integrating a base member, a biasing member, a lid, and a locking member in the lid assembly structure according to Embodiment 2.
Figure 12:
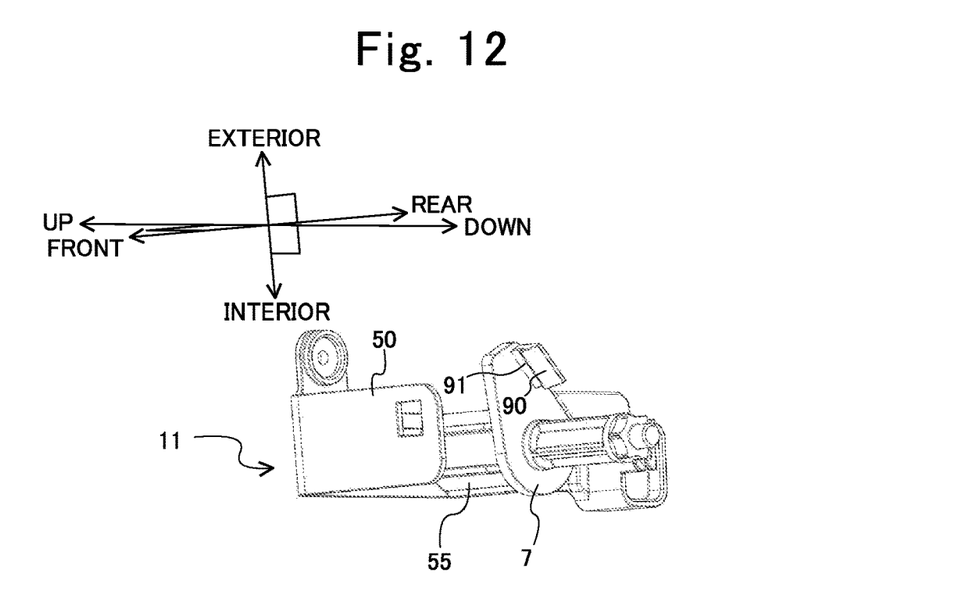
FIG. 12 schematically illustrates a second assembly obtained by integrating a shaft, a coupling member, and a cover member in the lid assembly structure according to Embodiment 2.

FIG. 10 schematically illustrates the lid assembly structure according to Embodiment 2 in a disassembled state. FIG. 11 schematically illustrates an assembly obtained by integrating a base member, a biasing member, a lid, and a locking member in the lid assembly structure according to Embodiment 2. FIG. 12 schematically illustrates a second assembly obtained by integrating a shaft, a coupling member, and a cover member in the lid assembly structure according to Embodiment 2.

Figure 15:
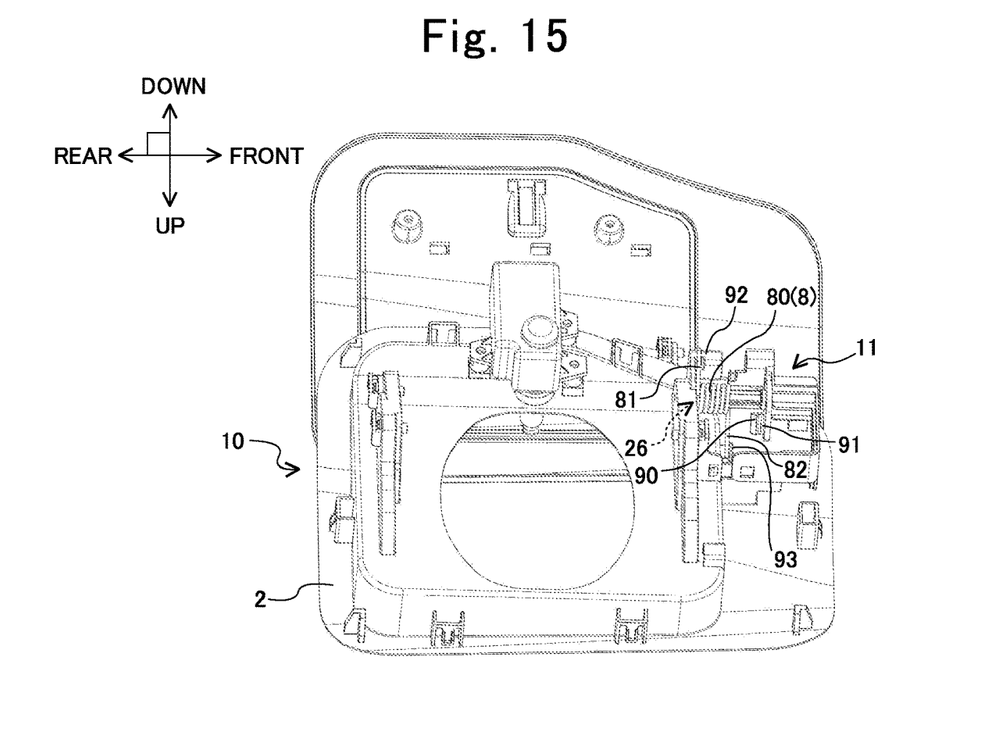
FIG. 15 schematically illustrates the lid assembly structure according to Embodiment 2 during assembling.
Figure 16:
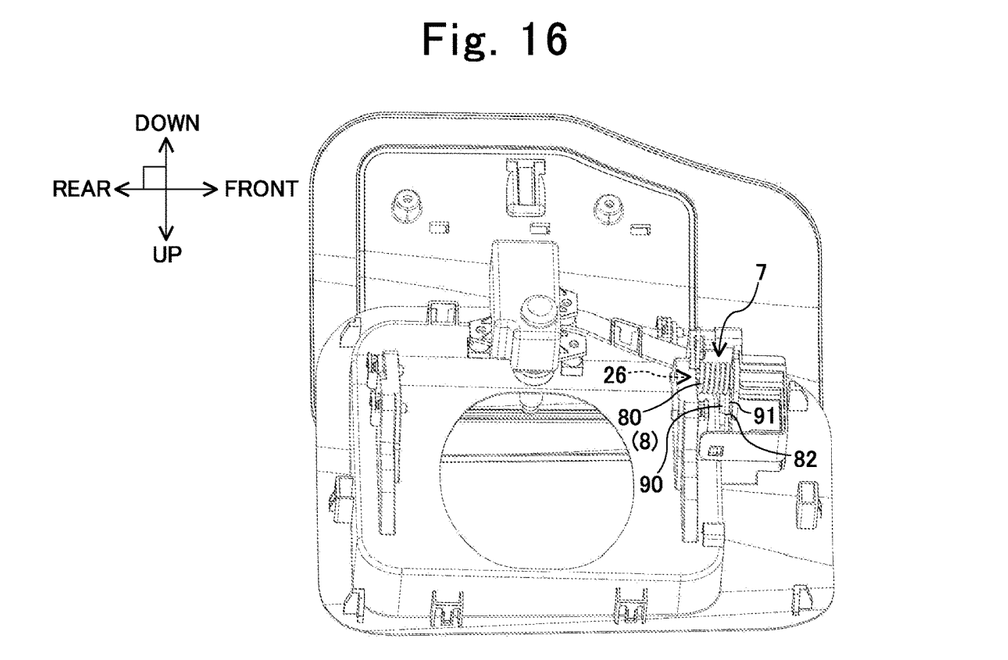
FIG. 16 schematically illustrates the lid assembly structure according to Embodiment 2 during assembling.

FIG. 13 to FIG. 16 schematically illustrate the lid assembly structure according to Embodiment 2 during assembling. In FIG. 15 and FIG. 16, the near side of the drawing sheet is the interior side, and the far side of the drawing sheet is the exterior side.

As shown in FIG. 10, a lid assembly structure 1 according to Embodiment 2 includes a base member 2, a lid 3, a locking member 4, and an opening/closing mechanism 5 as in the lid assembly structure 1 according to Embodiment 1.

The lid assembly structure 1 according to Embodiment 2 is significantly different from the lid assembly structure 1 according to Embodiment 1 in that a first engagement portion 92 and a temporary engagement portion 93 are provided to the base member 2 as shown in FIG. 11, and a main engagement portion 91 and a guide portion 90 are provided to a shaft 7 as shown in FIG. 12. Hereinafter, the lid assembly structure 1 according to Embodiment 2 will be described focusing on the differences from the lid assembly structure 1 according to Embodiment 1.

Figure 13:
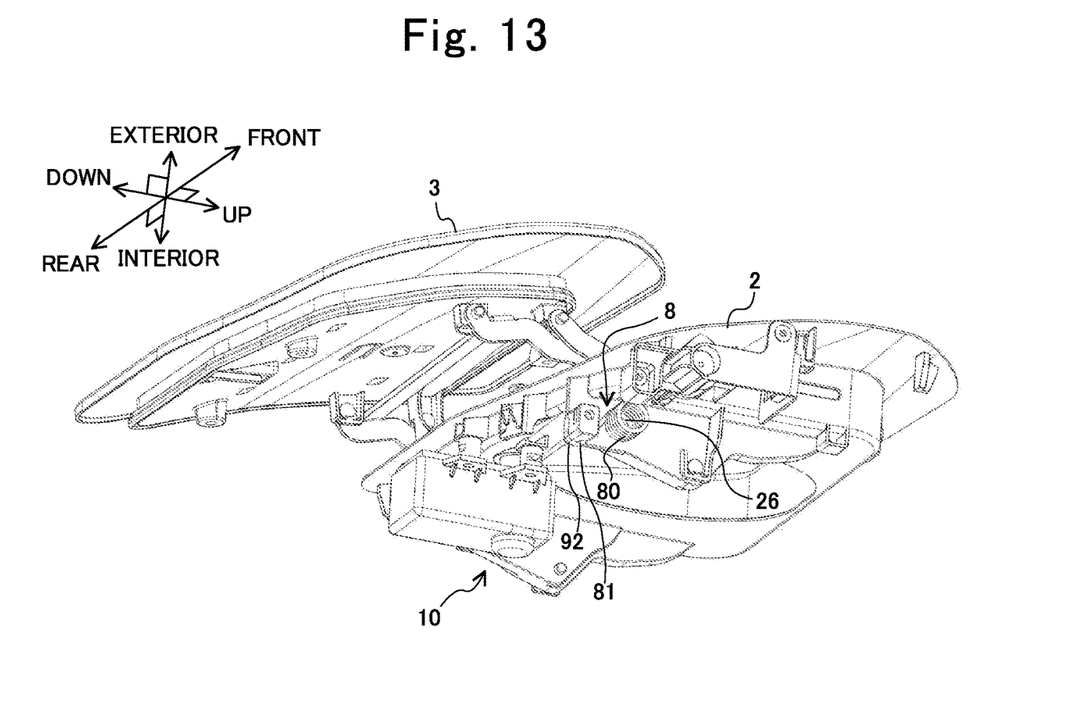
FIG. 13 schematically illustrates the lid assembly structure according to Embodiment 2 during assembling.
Figure 14:
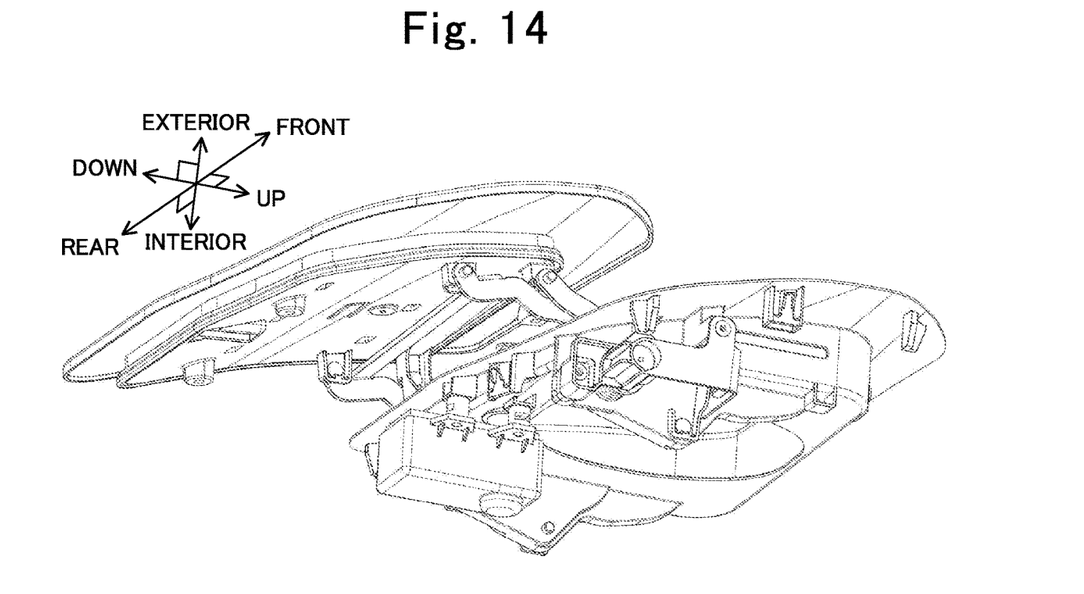
FIG. 14 schematically illustrates the lid assembly structure according to Embodiment 2 during assembling.

As shown in FIG. 11, FIG. 13, and FIG. 15, in the base member 2 in the lid assembly structure 1 according to Embodiment 2, the first engagement portion 92 and the temporary engagement portion 93 are provided on the radially outer side of the hole 26. The coil portion 80 of the biasing member 8 is assembled to the outer edge of the hole 26, the first engagement end 81 engages with the first engagement portion 92, and the second engagement end 82 engages with the temporary engagement portion 93. In the assembly 10 in which the base member 2, the biasing member 8, the lid 3, and the locking member 4 are assembled, the biasing member 8 is stably held by the base member 2 in a state where a slight biasing force is accumulated in the biasing member 8.

As shown in FIG. 15, the temporary engagement portion 93 has a groove shape, and the opening thereof is caused to face the interior side. When the position of the second engagement end 82 of the biasing member 8 is changed in the interior direction, the second engagement end 82 becomes detached from the temporary engagement portion 93, and the engagement between the second engagement end 82 and the temporary engagement portion 93 is released. Therefore, the disengagement direction of the temporary engagement portion 93 in the lid assembly structure 1 according to Embodiment 2 is the interior direction.

As shown in FIG. 12, the second assembly 11 is obtained by integrating the shaft 7, the coupling member 55, and the cover member 50. The main engagement portion 91 and the guide portion 90 are provided to the shaft 7 among these components.

As shown in FIG. 15, the main engagement portion 91 has a groove shape. The opening of the main engagement portion 91 is caused to face the interior side during assembling of the assembly 10 and the second assembly 11.

At the start of assembling of the assembly 10 and the second assembly 11 shown in FIG. 15, the second engagement end 82 of the biasing member 8 engages with the temporary engagement portion 93 of the base member 2. The guide portion 90 of the shaft 7 is located on the front side and the lower side of the second engagement end 82. The main engagement portion 91 is located on the further front side of the guide portion 90. The opening of the main engagement portion 91 is also caused to face the interior side.

The projection height of the guide portion 90 facing the interior side, that is, the height of the guide portion 90 in the disengagement direction of the temporary engagement portion 93, gradually increases from the temporary engagement portion 93 side toward the main engagement portion 91 side. In the lid assembly structure 1 according to Embodiment 2 as well, the guide portion 90 is considered to have an inclined wall shape having a height that gradually increases toward the fore side in the biasing force accumulation direction of the second engagement end 82.

Next, the second assembly 11 is advanced toward the rear side and brought closer to the assembly 10, and the shaft 7 is inserted into the coil portion 80 of the biasing member 8 and the hole 26, which is located on the rear side of the coil portion 80, as shown in FIG. 16.

Then, while the biasing member 8 is externally fitted to the shaft 7, the second engagement end 82 of the biasing member 8 moves onto the guide portion 90 of the shaft 7, the second engagement end 82 becomes detached from the temporary engagement portion 93, and the engagement between the second engagement end 82 and the temporary engagement portion 93 is released. When the second assembly 11 is further advanced toward the rear side, the second engagement end 82 is guided by the guide portion 90, the position of the second engagement end 82 is changed in the biasing force accumulation direction (to substantially the near side in FIG. 15) to accumulate a further biasing force, and the second engagement end 82 reaches the main engagement portion 91, which is provided to the shaft 7, and falls into the main engagement portion 91 having a groove shape. Accordingly, as shown in FIG. 16, the second engagement end 82 engages with the main engagement portion 91, and the state of the biasing member 8 is changed to the main assembled state.

As described above, in the lid assembly structure 1 according to Embodiment 2 as well, when the assembly 10 including the base member 2 and the biasing member 8 is assembled to the second assembly 11 including the shaft 7, the state of the biasing member 8 that has been in the temporary assembled state is automatically changed to the main assembled state while a part of the biasing force is accumulated in the biasing member 8. Accordingly, in the lid assembly structure 1 according to Embodiment 2 as well, the biasing member 8 is assembled to the shaft 7 which is a mating member, through simple work.

Although the present invention has been described above, the present invention is not limited to the above-described embodiments, etc., components described in the embodiments, etc., may be optionally extracted and combined to carry out the present invention, and various changes may be made without departing from the gist of the present invention.

In addition, the specification of the present invention discloses not only the technical concept indicated by the citation relationship between the claims as originally filed, but also the technical concept obtained by combining the matters recited in each claim as appropriate.

The invention claimed is:

1. A lid assembly structure comprising:
a base member attached to a vehicle body of a vehicle;
a lid whose position is changed between a closed position at which the lid covers an energy supply port provided in the vehicle body and an opened position at which the lid opens the energy supply port; and
an opening/closing mechanism assembled to the base member and the lid and configured to open/close the lid, wherein
the opening/closing mechanism includes a cover member assembled to the base member, a shaft assembled to the lid and rotatably supported on the cover member, and a biasing member attached to the shaft and configured to bias the lid to the opened position,
the shaft has a first engagement portion with which a first engagement end of the biasing member engages,
the cover member has a temporary engagement portion with which a second engagement end of the biasing member detachably engages,
the base member has a main engagement portion with which the second engagement end engages, and a guide portion configured to guide the second engagement end from the temporary engagement portion toward the main engagement portion, and
during assembling of the base member and the opening/closing mechanism, the biasing member whose first engagement end engages with the first engagement portion is guided by the guide portion, and a state of the biasing member is changed from a temporary assembled state where the second engagement end and the temporary engagement portion engage with each other to a main assembled state where the second engagement end and the main engagement portion engage with each other, thereby accumulating at least a part of a biasing force in the biasing member.

2. The lid assembly structure according to claim 1, wherein the biasing member is externally fitted to the shaft in the temporary assembled state.

3. The lid assembly structure according to claim 1, wherein the guide portion has an inclined wall shape.

4. A lid assembly structure comprising:
- a base member attached to a vehicle body of a vehicle;
- a lid whose position is changed between a closed position at which the lid covers an energy supply port provided in the vehicle body and an opened position at which the lid opens the energy supply port; and
- an opening/closing mechanism assembled to the base member and the lid and configured to open/close the lid, wherein
- the opening/closing mechanism includes a cover member assembled to the base member, a shaft assembled to the lid and rotatably supported on the cover member, and a biasing member attached to the shaft and configured to bias the lid to the opened position,
- the base member has a first engagement portion with which a first engagement end of the biasing member engages, and a temporary engagement portion with which a second engagement end of the biasing member detachably engages,
- the shaft has a main engagement portion with which the second engagement end engages, and a guide portion configured to guide the second engagement end from the temporary engagement portion toward the main engagement portion, and
- during assembling of the base member and the opening/closing mechanism, the biasing member whose first engagement end engages with the first engagement portion is guided by the guide portion, and a state of the biasing member is changed from a temporary assembled state where the second engagement end and the temporary engagement portion engage with each other to a main assembled state where the second engagement end and the main engagement portion engage with each other, thereby accumulating at least a part of a biasing force in the biasing member.

5. The lid assembly structure according to claim 4, wherein the biasing member is assembled to an outer edge of a through hole which is provided in the base member and into which the shaft is inserted, in the temporary assembled state, and is externally fitted to the shaft in the main assembled state.

6. The lid assembly structure according to claim 4, wherein the guide portion has an inclined wall shape.

* * * * *